(12) United States Patent
Nass

(10) Patent No.: US 8,886,809 B2
(45) Date of Patent: Nov. 11, 2014

(54) WIRELESS NODE AUTO-RESET FUNCTION

(75) Inventor: Geoffrey Daniel Nass, Rolling Meadows, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 611 days.

(21) Appl. No.: 11/779,399

(22) Filed: Jul. 18, 2007

(65) Prior Publication Data
US 2009/0024686 A1    Jan. 22, 2009

(51) Int. Cl.
*H04L 29/06* (2006.01)
*H04L 12/28* (2006.01)

(52) U.S. Cl.
CPC ..... *H04L 12/2803* (2013.01); *H04L 2012/2841* (2013.01)
USPC .............................................. 709/227; 714/1

(58) Field of Classification Search
USPC ......................................................... 709/227
See application file for complete search history.

(56) References Cited

U.S. PATENT DOCUMENTS

| | | | | |
|---|---|---|---|---|
| 6,654,353 | B1 * | 11/2003 | Tokura et al. | 370/254 |
| 7,876,704 | B1 * | 1/2011 | Bims et al. | 370/254 |
| 2002/0049933 | A1 * | 4/2002 | Nyu | 714/43 |
| 2002/0087669 | A1 * | 7/2002 | Idsinga | 709/222 |
| 2003/0027526 | A1 * | 2/2003 | Hillyard | 455/41 |
| 2005/0249123 | A1 * | 11/2005 | Finn | 370/242 |
| 2006/0031934 | A1 | 2/2006 | Kriegel | |

FOREIGN PATENT DOCUMENTS

EP    1626532 A2    2/2006

OTHER PUBLICATIONS

International Search Report dated Nov. 16, 2008 for Application No. PCT/US2008/007650.

* cited by examiner

*Primary Examiner* — Jeffrey Pwu
*Assistant Examiner* — Thong Truong

(57) ABSTRACT

A method for wireless communication within a building automation system is disclosed. The method includes establishing a communications link between a first automation component and a second automation component, detecting a change in the communications link at the second automation component, and initiating a reset function on the second automation component in response to the detected change in the communications link. A building automation system is further disclosed. The system includes a first automation component, a second automation component in communication with the first automation component via a communication link. The second automation component further includes a reset function stored on a memory and executable by a processor in communication with the memory, such that the reset function is activated in response to a change in the communications link.

19 Claims, 2 Drawing Sheets

WIRELESS NODE AUTO-RESET FUNCTION

BACKGROUND

The present disclosure generally relates to building automation systems. In particular, the present disclosure relates to automatically resetting and controlling wired and wireless building automation components within a building automation system.

A building automations system (BAS) typically integrates and controls elements and services within a structure such as the heating, ventilation and air conditions (HVAC) system, security services, fire systems and the like. The integrated and controlled systems are arranged and organized into one or more floor level networks (FLNs) containing application or process specific controllers, sensors, actuators, or other devices distributed or wired to form a network. The floor level networks provide general control for a particular floor or region of the structure. For example, a floor level network may be an RS-485 compatible network that includes one or more controllers or application specific controllers configured to control the elements or services within floor or region. The controllers may, in turn, be configured to receive an input from a sensor or other device such as, for example, a temperature sensor (RTS) deployed to monitor the floor or region. The input, reading or signal provided to the controller, in this example, may be a temperature indication representative of the physical temperature. The temperature indication can be utilized by a process control routine such as a proportional-integral control routine executed by the controller to drive or adjust a damper, heating element, cooling element or other actuator towards a predefined set-point.

Information such as the temperature indication, sensor readings and/or actuator positions provided to one or more controllers operating within a given floor level network may, in turn, be communicated to an automation level network (ALN) or building level network (BLN) configured to, for example, execute control applications, routines or loops, coordinate time-based activity schedules, monitor priority based overrides or alarms and provide field level information to technicians. Building level networks and the included floor level networks may, in turn, be integrated into an optional management level network (MLN) that provides a system for distributed access and processing to allow for remote supervision, remote control, statistical analysis and other higher level functionality. Examples and additional information related to BAS configuration and organization may be found in the co-pending U.S. patent application Ser. No. 11/590,157 (2006P18573 US), filed on Oct. 31, 2006, and co-pending U.S. patent application Ser. No. 10/915,034 (2004P13093 US), filed on Aug. 8, 2004, the contents of these applications are hereby incorporated by reference for all purposes.

Wireless devices, such as devices that comply with IEEE 802.15.4/ZigBee protocols, may be implemented within the control scheme of a building automation system without incurring additional wiring or installation costs. ZigBee-compliant devices such as full function devices (FFD) and reduced function devices (RFD) may be interconnected to provide a device net or mesh within the building automation system. For example, full function devices are designed with the processing power necessary to establish peer-to-peer connections with other full function devices and/or execute control routines specific to a floor or region of a floor level network. Each of the full function devices may, in turn, communicate with one or more of the reduced function devices in a hub and spoke arrangement. Reduced function devices such as the temperature sensor described above are designed with limited processing power necessary to perform a specific task(s) and communicate information directly to the connected full function device.

Wired and wireless devices while operating within a building automation system may occasionally freeze or lock-up due to hardware or software faults, errors or other incidents. These frozen or non-working devices within the building automation system result in information, monitoring and communication dead or blind spots in which control may not be fully implemented.

SUMMARY

The present disclosure generally provides for resetting and controlling wired and wireless devices and/automation components operating within a building automation system (BAS). Generally the disclosed system and method provides for regularly polling or querying devices such as wired or wireless automation components operating within a node, region, floor level network (FLN), etc. The query, in turn, may be utilized to initiate a reset function in one or more of the devices based on at least one predefined criterion.

In one embodiment, a method for wireless communication within a building automation system is disclosed. The method includes establishing a communications link between a first automation component and a second automation component, detecting a change in the communications link at the second automation component, and initiating a reset function on the second automation component in response to the detected change in the communications link.

In another embodiment, a building automation system is disclosed. The building automation includes a first automation component and a second automation component in communication with the first automation component via a communication link. The second automation component further includes a reset function stored on a memory and executable by a processor in communication with the memory, wherein the reset function activated in response to a change in the communications link.

In another embodiment, an automation component is disclosed. The automation component includes a memory configured to store a reset function, a processor in communication with the memory and configured to execute the reset function, and a communication port configured to receive a communication signal, and provide the received communication signal to the processor, wherein the processor execute with reset function in response to a change in the received communication signal.

Additional features and advantages of the present invention are described in, and will be apparent from, the following Detailed Description and the figures.

BRIEF DESCRIPTION OF THE FIGURES

The method, system and teaching provided relate to resetting and controlling automation components within a building automation system (BAS).

DETAILED DESCRIPTION

Figure 1:
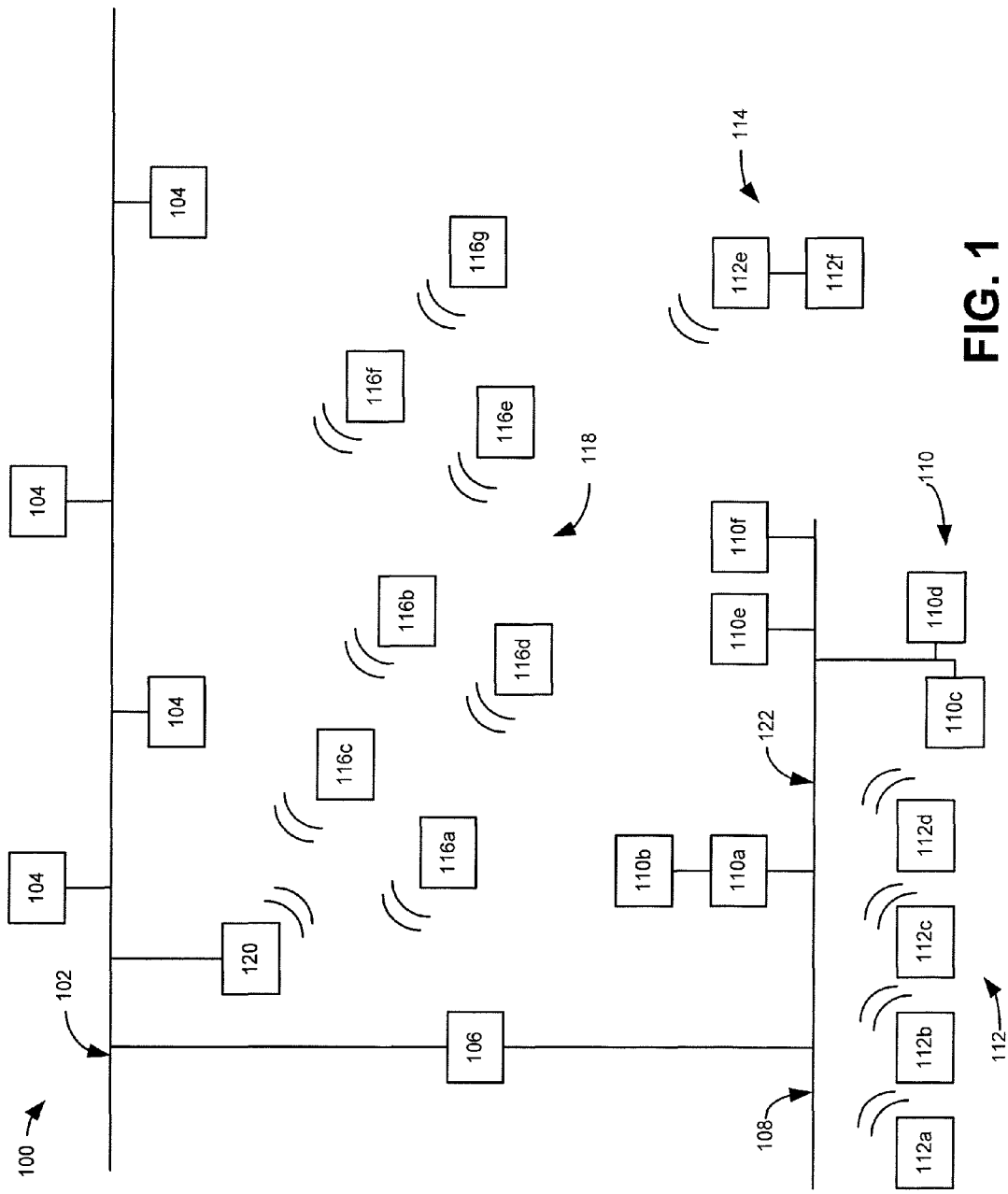
FIG. 1 illustrates an embodiment of a building automation system configured in accordance with the disclosure provided herein.

The embodiments discussed herein include automation components, wireless devices and transceivers. The devices may be IEEE 802.15.4/ZigBee-compliant automation components such as: a personal area network (PAN) coordinator which may be implemented as a field panel transceiver (FPX); a full function device (FFD) implemented as a floor level device transceiver (FLNX); and a reduced function device (RFD) implemented as a wireless room temperature sensor (WRTS) that may be utilized in a building automation system (BAS). The devices identified herein are provided as an example of automation components, wireless devices and transceivers that may be integrated and utilized within a building automation system embodying the teachings disclosed herein and are not intended to limit the type, functionality and interoperability of the devices and teaching discussed and claimed herein.

I. System Overview

One exemplary building automation system that may include the devices and be configured as described above is the APOGEE® system provided by Siemens Building Technologies, Inc. The APOGEE® system may implement RS-485 wired communications, Ethernet, proprietary and standard protocols, as well as IEEE 802.15.4 wireless communications which are compliant with the ZigBee standards and/or ZigBee certified wireless devices or automation components. ZigBee standards, proprietary protocols or other standards are typically implemented in embedded applications that may utilize low data rates and/or require low power consumption. Moreover, ZigBee standards and protocols are suitable for establishing inexpensive, self-organizing, mesh networks which may be suitable for industrial control and sensing applications such as building automation. Thus, a building automation system such as the APOGEE® system configured in compliance with ZigBee standards or protocols may require limited amounts of power allowing individual wireless devices, to operate for extended periods of time on a finite battery charge.

The wired or wireless devices such as the IEEE 802.15.4/ZigBee-compliant automation components may include, for example, an RS-232 connection, an RJ11 connection, an RJ45 Ethernet compatible port, and/or a universal serial bus (USB) connection. These wired, wireless device or automation components may, in turn, be configured to include or interface with a separate wireless transceiver or other communications peripheral thereby allowing the wired device to communicate with the building automation system via the above-described wireless protocols or standards. Alternatively, the separate wireless transceiver may be coupled to a wireless device such as a IEEE 802.15.4/ZigBee-compliant automation component to allow for communications via a second communications protocol such as, for example, 802.11x protocols (802.11a, 802.11b ... 802.11n, etc.) These exemplary wired, wireless devices may further include a man-machine interface (MMI) such as a web-based interface screen that provide access to configurable properties of the device and allow the user to establish or troubleshoot communications between other devices and elements of the BAS.

FIG. 1 illustrates an exemplary building automation system or control system 100 that may incorporate the methods, systems and teaching provided herein. The control system 100 includes a first network 102 such as an automation level network (ALN) or management level network (MLN) in communication with one or more controllers such as a plurality of terminals 104 and a modular equipment controller (MEC) 106. The modular equipment controller or controller 106 is a programmable device which may couple the first network 102 to a second network 108 such as a floor level network (FLN). The second network 108, in the exemplary embodiment, may include a wired network 122 that connects or interconnects building automation components 110 (individually identified as automation components 110a to 110f). The controller 106 or second network 108 may further be coupled to wireless building automation components 112. For example, the building automation components 112 may be wireless devices individually identified as automation components 112a to 112f. The automation components 112e and 112f may be arranged to define an interconnected wireless node 114.

The control system 100 may further includes automation components 116 configured to establish a mesh network or subnet 118. The automation components 116a to 116g such as, for example, the configurable terminal equipment controller (TEC), cooperate to wirelessly communicate information between the second network 108, the control system 100 and other devices within the mesh network 118. For example, the automation components 116a to 116g may communicate with other components within the mesh network 118 by sending a message addressed to the media access control (MAC) address assigned to each of the interconnected devices, the reduced function devices or full function devices collectively identified by the reference numeral 120.

The automation components 112e and 112f in communication with the second network 108, and the automation components 116 to 116g forming the mesh network 118 may be arranged in variety of configurations to facilitate communications within the control system 100. For example, the automation components 112, 116 may be configured to establish one or more communication links between each other, the field panel 120, the second network 108, one or more of the controllers 106, or terminals 104 or other component of the control system 100.

The communication link, as used herein, may represent the physical or logical connection between one or more of the automation components 110, 112, 116, the modular equipment controller 106, the field panel 120 and/or the terminals 104. For example, in one embodiment the term communication link may refer to the information, signal, message or query communicated between devices within the control system 100. In another embodiment, the term communication link may refer to the method or medium by which communications are passed between devices operating in the control system 100. For example, the communication link may refer to a physical wire or cable connection between device, or a wireless connection established between devices. Moreover, the communication links may refer to a combination of these embodiments. Thus, the communication link may refer to, for example: (a) a wired connection between devices; or (b) a wireless connection between devices, where in both cases a signal, query or message is communicated from one device to another at a regular or irregular time interval or time period.

The term automation component may be generally utilized to describe and refer to any device, wired or wireless, operating or communicating with the control system 100. Thus, the automation component may be a full function device, a reduced function device, a wireless device, a wired device, a terminal or laptop computer, and/or any controller operating or executing control routines, monitoring functions or other building or floor level operations within the control system 100.

The automation components including all of the devices operating within the control system 100 may be configured or designed to include a processor such as an INTEL® PEN- TIUM class processor in communication with a memory or storage medium. The memory or storage medium may be a hard disk drive (HDD), random access memory (RAM) and/or flashable or non-flashable read only memory (ROM). In one configuration, the automation component may be configured to include high level functionality and low level functionality. For example, the low level functionality of the automation component may include measurement and storage of temperature or flow readings, reporting or monitoring device status, or other functions that do not include a great deal of processing power and/or capacity. Alternatively, the high level functionality of the automation component may include execution of control routines, communications with other automation components or device operating within the control system 100 and/or the analysis of measurements or other data collected and provided by the low level functionality.

II. System Control and Functionality

In operation, the control system 100 communications with constituent automation components to receive gathered information, analyze the gathered information and implement control strategies designed to control, monitor and regulate a building space. Occasionally, one or more of the automation components may lock-up, freeze or otherwise discontinue communication with the other automation components operating within the control system 100 due to, for example, a hardware fault, an overflow of a wireless network stack and/or wireless or other applications faults. These occurrences result in a dead spot within the control system 100 in which information, signals or other communication links cannot be established or transmitted. It would be desirable to provide a control or functionality that could allow the frozen or non-operative automation component to automatically reset or restart upon detection of such a non-responsive condition or state. Such a system or functionality could increase the overall performance of the control system 100, reduce the number and frequency of service requests and provide a fail-safe for a number of unknown and unforeseeable problems which may occur in complex systems.

Figure 2:
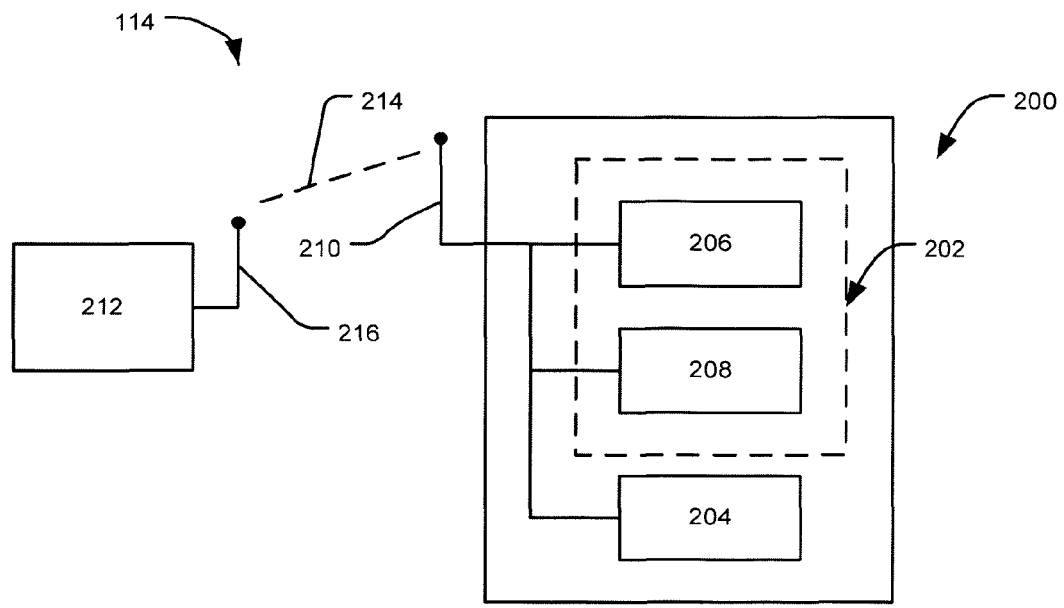
FIG. 2 illustrates an embodiment of a wireless node configured to operate within the building automation system showing in FIG. 1.

FIG. 2 illustrates one example of the wireless node 114 configured to implement an auto-reset function in response to or upon detection of a non-functioning or locked-up automation component 200. As previously discussed, the automation component can be any reduced function device (RFD) such as the automation components 110, 112 and 116 and any full function device (FFD) such as a personal area network (PAN) coordinator which may be implemented as a field panel transceivers (FPX), a floor level device transceiver (FLNX), and other network devices. In this exemplary embodiment, the automation component 200 includes a memory 202 storing computer readable code executable on a processor 204. The memory 202 may include a first memory portion 206 configured to store computer readable code or instructions associated with the high level functionality of the component. For example, the first memory portion 206 may be configured to store tasks, instructions, protocols and information associated with or necessary for communications via a wireless transceiver 210. The memory may further include a second memory portion 208 configured to store computer readable code or instructions associated with the low or lower level functionality of the component. For example, if the automation component 200 is a wireless room temperature sensor, the second memory portion 208 may store the code and instructions necessary to gather temperature readings, to store the gathered readings, etc.

An automation component 212 may, in turn, be in communication with the automation component 200 via a communication link 214. The communication link 214, as indicated by dotted line in the FIG. 2, may represent the wireless communication link between a wireless transceiver 216 in communication with the automation component 212 and the wireless transceiver 210. Alternatively, the communication link 214 may indicate information such as the gathered temperature readings communicated between the two components.

In one embodiment, the automation component 200 is configured to implement an automatic reset function. For example, the second memory portion 208 may be programmed with computer readable instructions directed to implement the automatic or auto-reset function upon satisfaction of one or more predefined condition or the occurrence of one or more events. During normal operation the automation component 212, which in this case may be a full function device such as a wireless field panel (FPX), may operate as a master device and regularly poll or query the automation component 200 which in this case may be any network device such as a terminal equipment control (TEC) which may be operating as a slave device. The poll or query may be, for example, a status request, a change of value request, a simple network or IP ping or any other communication. It will be understood that the same query sent from the master automation component 212 may be directed to or received by numerous slave automation components 200 operating within the wireless node 114.

The auto-reset function may be stored and executed by the second memory portion 208 and the processor 204. The location, storage, and implementation of the auto-reset function may be determined or selected to minimize the likelihood that the function would be subject to a hardware or software freeze or lock-up. Thus, in this embodiment the auto-reset function is implemented in the second memory portion 208 as a portion of the low level device functionality in an attempt to isolate or insulate the function from complications that may arise in connection with the high level functionality implemented on the first memory portion 206. Stated another way, if the first memory portion 206 acting in cooperation with the processor 204 experiences a freeze or lock-up over one or more of the high level hardware or software functions, then the auto-reset function will still be implemented with the low level functions operating in conjunction with the second memory portion 208 and the processor 204.

In one embodiment, the poll or query from the master automation component 212 may be communicated via the communication link 214 to the slave automation component 200 at a regular, timed interval. The slave automation component 200 may include a timer function (not shown) implemented as a part of the second memory portion 208 and/or the processor 204. The timer may act as a countdown which is only reset or restarted upon receipt of the poll or query. Thus, the master automation component 212 may send a query to the slave automation component 200 requesting and change of value update, e.g., to determine if a measured or calculated value or variable provided by the automation component 200 had changed, the query may be received by the wireless transceiver 210 and provided by one or more of the high level functions operating in the first memory portion 206 to the timer and/or auto-reset routine operating in the second memory portion 208. Receipt of the query, in turn, may act to reset or restart the timer such that the auto-reset function remains inactive. However, if the poll or query where not to be received or provided to the timer and/or auto-reset function because the first memory portion 206 was locked up, frozen or the wireless transceiver was inactive or inoperable, the timer would countdown to zero (0) and activate the auto-reset function. Activation of the auto-reset function causes the slave automation component 200 to restart and reinitialize in an effort to restore the locked, frozen or otherwise inoperative functionality, and restore communication with the master automation component 212 and the wireless node 114.

Figure 3:
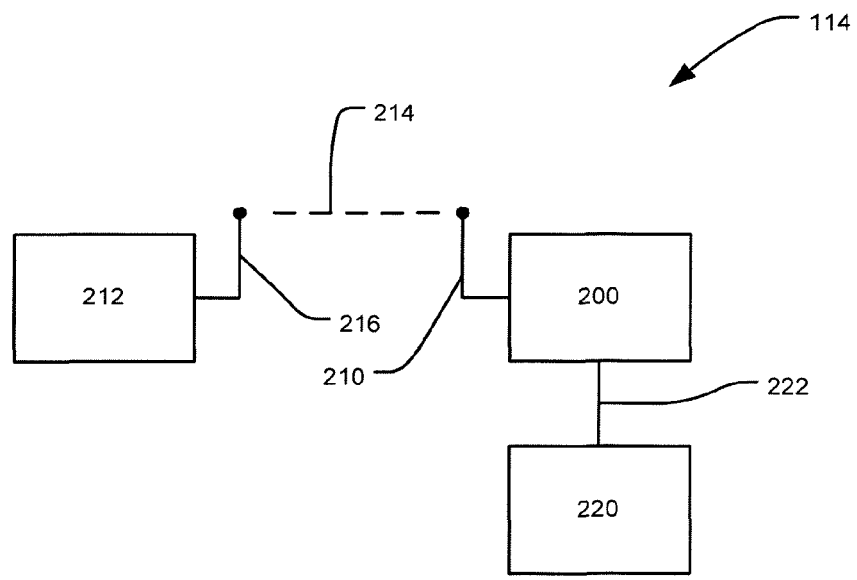
FIG. 3 illustrates an embodiment of a wired node configured to operate within the building automation system showing in FIG. 1.

FIG. 3 illustrates another embodiment in which the automation component 212 and the automation component 200 are in wireless communication via the communication link 214. In this embodiment, the automation component 200 may be a full function device, a reduced function device or simply a wireless transceiver relay or hub into which other automation components may connect. For example, the automation component 220 may be a room temperature sensor (RTS) without wireless capability. The automation component 220 may be hardwired or connected to the automation component 200 through a communication link 222 thereby providing the automation component 220 with a wireless communication capability. In this embodiment, the auto-reset function or functionality may be operable on the automation component 220.

The automation component 220 may further include a timer or countdown controlled or reset by the receipt of a query, change-of-value request, restart command or other signal provided by the automation component 200 and/or the automation component 212. For example, the automation component 200 may operate in the manner described in connection the embodiment shown in FIG. 2 and simply provide, or fail to provide, the same query to the automation component 220 via the communication link 222. Thus, the presence or absence of the same poll or query provided by the automation component 212 could control the auto-reset functionality of both automation components 200, 220.

Alternatively, the automation component 200 could include a keep-alive function operable in cooperation with the second memory portion 208 and the processor 204. The keep-alive function may provide a timed pulse or signal to the automation component 220 to start the timer associated with the auto-reset function executing therein.

Alternatively, the keep-alive function could provide a continuous signal to the automation component 220 via the communication link 22. If the continuous signal were disabled or absent due to a failure, lock-up or freeze attributable to one or more components or portions within the automation component 200, the absence of the continuous signal may be utilized to activate or trigger the auto-reset function within the automation component 220.

Alternatively, the automation component 200 may have been reset or restarted in response to the expiration of the timer function and the activation if the auto-reset function operable therein. Because communications signals and other information flow bi-directionally through the automation component 200 via the communication links 214, 222; disruptions, problems, etc. may be detected as the information or query makes a round-trip from the master device e.g., automation component 212, to one or more of the slave devices, e.g., automation component 200 or automation component 220.

The functionality and/or variables associated with the auto-reset function operable within one or more of the automation components 200, 212 and 220 may be configured using, for example, a wireless tool (TLX) or any other script editing program. The tool may be utilized to edit an auto-reset timeout value associated with the timer within one or more of the automation components 200, 212 and 220, to determine or query the individual automation components for the number of times they have reset, and/or the amount of time since the last reset the node has been running.

It should be understood that various changes and modifications to the presently preferred embodiments described herein will be apparent to those skilled in the art. For example, the elements of these configurations could be arranged and interchanged in any known manner depending upon the system requirements, performance requirements, and other desired capabilities. Well understood changes and modifications can be made based on the teachings and disclosure provided by the present invention and without diminishing from the intended advantages disclosed herein. It is therefore intended that such changes and modifications be covered by the appended claims.

What is claimed is:

1. A method for wireless communication within a building automation system, the method comprising:
   establishing a first communications link, the first communications link being between a first automation component and a second automation component;
   sending a communication signal from the first automation component to the second automation component via the first communications link;
   detecting a change in the first communications link, via which the communication signal is sent from the first automation component to the second automation component, at the second automation component based on the sending, wherein detecting the change in the first communications link includes detecting absence of the communication signal at the second automation component;
   initiating a reset function on the second automation component in response to the detected absence of the communication signal at the second automation component, the initiated reset function on the second automation component comprising restarting the second automation component;
   establishing a second communications link, the second communications link being between the second automation component and a third automation component;
   detecting a change in the second communications link, via which the communication signal is sendable from the second automation component to the third automation component when the communication signal is received by the second automation component from the first automation component, at the third automation component, wherein detecting the change in the second communications link includes detecting absence of the communication signal at the third automation component; and
   initiating a reset function on the third automation component in response to the detected absence of the communication signal at the third automation component, the initiated reset function on the third automation component comprising restarting the third automation component.

2. The method of claim 1, further comprising:
   generating the communication signal at the first automation component; and
   receiving the communication signal at the second automation component.

3. The method of claim 1, wherein at least one automation component of the first automation component and the second automation component is a full function device.

4. The method of claim 1, wherein at least one automation component of the first automation component and the second automation component is a reduced function device.

5. The method of claim 1, wherein detecting the change in the first communications link includes periodically detecting the change according to a timed interval.

6. The method of claim 1, wherein the first automation component is selected from the group consisting of: a full function device; a reduced function device, a terminal, and a portable computer.

7. The method of claim 1, wherein detecting the change in the first communications link comprises detecting the change in the first communications link when the communication signal is not received at the second automation component.

8. A building automation system comprising:
- a first automation component;
- a second automation component in communication with the first automation component via a first communication link, the second automation component comprising:
  - a reset function stored on a memory and executable by a processor in communication with the memory, wherein a communication signal or a status query is sent from the first automation component to the second automation component via the first communication link, and wherein the reset function of the second automation component is activated at the second automation component in response to a change in the first communication link, the change in the first communication link detected based on the sending of the communication signal or the status query, the detected change in the first communication link including absence of the communication signal or the status query at the second automation component, the activated reset function of the second automation component comprising a restart of the second automation component; and
- a third automation component in communication with the second automation component via a second communication link, the third automation component comprising:
  - a reset function stored on a memory and executable by a processor in communication with the memory, wherein the second automation component is configured to send the communication signal or the status query to the third automation component via the second communication link when the communication signal is received by the second automation component from the first automation component, and wherein the reset function of the third automation component is activatable at the third automation component in response to a change in the second communication link, the change in the second communication link detected based on absence of the communication signal or the status query at the third automation component, the activated reset function of the third automation component comprising a restart of the third automation component.

9. The system of claim 8, wherein the first communication link between the first automation component and the second automation component is a wired communication link.

10. The system of claim 8, wherein the first communication link between the first automation component and the second automation component is a wireless communication link.

11. The system of claim 8, wherein at least one automation component of the first automation component and the second automation component is a full function device.

12. The system of claim 8, wherein at least one automation component of the first automation component and the second automation component is a reduced function device.

13. The system of claim 8, wherein activation of the reset function of the second automation component is in response to a null signal associated with the first communication link.

14. An automation component comprising:
- a memory having a first memory portion and a second memory portion, the first memory portion configured to store instructions associated with high-level functionality of the automation component, and the second memory portion configured to store a reset function;
- a processor in communication with the memory and configured to execute the reset function; and
- a communication port configured to receive a communication signal sent from another automation component, and provide the received communication signal to the processor;
- wherein the processor is configured to execute the reset function in response to absence of the communication signal sent from the other automation component, the executed reset function comprising a restart of the automation component,
- wherein the communication port is configured to send the communication signal to a further automation component, a processor of the further automation component configured to execute a reset function stored in a memory of the further automation component in response to absence of the communication signal sent from the automation component to the further automation component, the executed reset function of the further automation component comprising a restart of the further automation component.

15. The component of claim 14, wherein the processor of the automation component includes a timer function having a timed period, and
wherein the reset function of the automation component is executed based on the timed period.

16. The component of claim 14, wherein the communication port is a wireless communication port.

17. The component of claim 14, wherein the communication port is a wired communication port.

18. The component of claim 14, wherein the communication signal is a null signal.

19. The automation component of claim 14, wherein the change in the received communication signal is due to one or more faults, errors, or incidents in the high-level functionality of the automation component.

* * * * *